(12) United States Patent
Liao et al.

(10) Patent No.: US 8,189,164 B2
(45) Date of Patent: May 29, 2012

(54) MODULARIZED DISPLAY COMPONENT AND MANUFACTURING METHOD THEREOF

(75) Inventors: Chi-Chang Liao, Tai Nan (TW); Lung-Pin Hsin, Tai Chung (TW); Jau-Min Ding, Taipei (TW)

(73) Assignee: Industrial Technology Research Institute, Hsinchu County (TW)

( * ) Notice: Subject to any disclaimer, the term of this patent is extended or adjusted under 35 U.S.C. 154(b) by 420 days.

(21) Appl. No.: 12/557,528

(22) Filed: Sep. 11, 2009

(65) Prior Publication Data

US 2009/0323013 A1 Dec. 31, 2009

Related U.S. Application Data

(62) Division of application No. 11/182,843, filed on Jul. 18, 2005, now Pat. No. 7,609,356.

(30) Foreign Application Priority Data

Apr. 19, 2005 (TW) ................ 94112441 A

(51) Int. Cl.
*G02F 1/1339* (2006.01)

(52) U.S. Cl. ........................................... 349/156

(58) Field of Classification Search ............ 349/156
See application file for complete search history.

(56) References Cited

U.S. PATENT DOCUMENTS

| | | | |
|---|---|---|---|
| 4,653,864 A | 3/1987 | Baron et al. |
| 4,744,639 A | 5/1988 | Tsuboyama |
| 5,793,457 A | 8/1998 | Tamai et al. |
| 5,828,434 A | 10/1998 | Koden et al. |
| 5,880,803 A | 3/1999 | Tamai et al. |
| 5,917,572 A | 6/1999 | Kurauchi et al. |
| 6,067,141 A | 5/2000 | Yamada et al. |
| 6,208,402 B1 | 3/2001 | Tajima |
| 7,133,108 B2 | 11/2006 | Shimizu et al. |
| 7,274,424 B1 | 9/2007 | Kurihara et al. |
| 2004/0209008 A1 | 10/2004 | Liang et al. |
| 2005/0088606 A1 | 4/2005 | Ashizawa et al. |

FOREIGN PATENT DOCUMENTS

| | | |
|---|---|---|
| CN | 1207180 A | 2/1999 |
| CN | 1282951 A | 2/2001 |

*Primary Examiner* — James Dudek
(74) *Attorney, Agent, or Firm* — Rabin & Berdo, P.C.

(57) ABSTRACT

A modulized display component and a manufacturing method for the same are disclosed in this invention. The display component of this invention is designed according to a modulization concept so that it can be attached to any driving circuit layer. Further, various manufacturing techniques can be used to form the alignment layers and protective layers in order to fabricate a trans-reflective, reflective, or transmissive color displaying component.

38 Claims, 5 Drawing Sheets

MODULARIZED DISPLAY COMPONENT AND MANUFACTURING METHOD THEREOF

CROSS-REFERENCE TO RELATED APPLICATIONS

This is a division of U.S. application Ser. No. 11/182,843, filed Jul. 18, 2005, and which claimed priority from Taiwanese application No. 094112441, filed Apr. 19, 2005, the entire disclosure of which is incorporated herein by reference.

BACKGROUND OF THE INVENTION

1. Field of the Invention

The present invention is related to a display component and a manufacturing method for the same, and more particularly, to a modularized display component and a manufacturing method for the same.

2. Description of Related Art

With the unceasing progress in manufacturing techniques for liquid crystal display (LCD) devices, conventional rigid silicon substrates or flat glass substrates are gradually being replaced by flexible plastic substrates or thin metal substrates. The flexible substrates can be made with various radian measures and used to form a display that can be rolled, or a microelectronic product with a large display area. Via this technique, using the roll-to-roll printing process to produce flexible display products with large display areas, such as electronic papers or electronic books, is now a possibility.

U.S. Publication 2004/0209008A1 discloses compositions and an assembly process for the manufacture of liquid crystal displays. Reference is made to FIG. 1, which is a schematic diagram of a assembly structure provided in U.S. Publication 2004/0209008A1. The assembly structure has a bottom substrate 10 and a top substrate 22. Either the bottom substrate 10, the top substrate 22, or both, has a conductive layer. The bottom substrate 10 includes a first alignment layer and a conductive layer that is not essential. Spacers 16 and microstructures 12 are built on the first alignment layer by, for example, a screen printing process, a coating process, or a photolithography process. Liquid crystal compositions 14 are filled between microstructures 12 and a photoalignable top-sealing layer 18. The top substrate 22 includes a transparent conductive layer as well as an isolated layer and, selectively, an overcoating layer 20. The top substrate 22 itself is an alignable layer or a pre-aligned layer. The top substrate 22 is disposed on the isolated layer or the overcoating layer 20 via a lamination process, a coating process, a screen printing process, a vapor deposition process, a sputtering process, or a combination thereof. The top substrate 22 or the bottom substrate 10 can be further attached with a color film, a moisture or oxygen barrier or an optical compensation layer. Finally, polarizer films and/or other light management films can also be applied for assembly of display devices.

The assembly structure disclosed in the publication mentioned above has a drawback that the spacer 16 cannot be made of different materials and the photoalignable top-sealing layer 18 is unstable.

SUMMARY OF THE INVENTION

An objective of the present invention is to provide a modularized display component and a manufacturing method for the same to improve the production rate and provide a greater variety of display modes. The manufacturing process can be performed with conventional equipment, and the problems of flexible substrates being difficult to make, and having a low temperature tolerance, can be prevented.

For reaching the objective above, the present invention provides a method for manufacturing a modularized display component, including providing a substrate; forming an electrode layer on the substrate; providing multiple wall structures on the electrode layer; forming an alignment layer covering the wall structures; filling display medium into spaces enclosed with the wall structures; and forming a protective layer on top of the filled wall structures.

For reaching the objective above, the present invention provides a modularized display component, including a substrate, an electrode layer formed on the substrate, multiple wall structures formed on the electrode layer, an alignment layer covering the wall structures, a display medium filled in spaces enclosed with the wall structures, and a protective layer formed on top of the filled wall structures.

Numerous additional features, benefits and details of the present invention are described in the detailed description, which follows.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF PREFERRED EMBODIMENTS

The present invention uses a flexible component manufacturing technique together with a semiconductor manufacturing technique to provide a modularized display component. Reference is made to FIGS. 1-9, which show a manufacturing procedure of a modularized display component in accordance with a preferred embodiment of the present invention. The manufacturing procedure has the steps described as follows.

Figure 1:
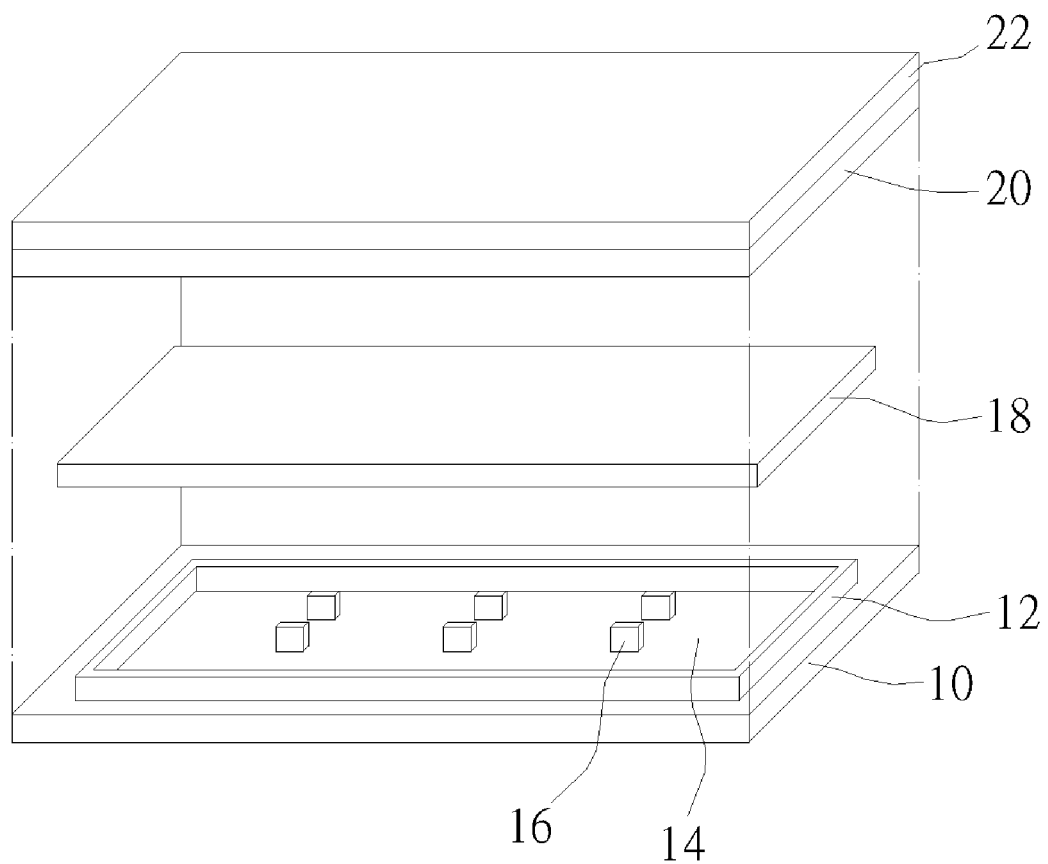
FIG. 1 is a schematic diagram of a conventional assembly structure.
Figure 2:
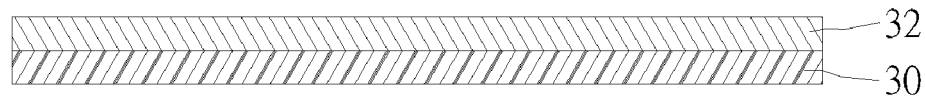
FIG. 2 shows a substrate of the modularized display component made in accordance with the manufacturing procedure of the present invention.

Reference is made to FIG. 2, which shows a substrate of the modularized display component made in accordance with the manufacturing procedure of the present invention. First, a substrate 30 is provided. The substrate 30 is flexible and the appearance of the substrate 30 is a sheet or a film. The substrate 30 can be a macromolecule substrate, an organic/inorganic compound substrate or a polarizer substrate. If the appearance of the substrate 30 is a sheet, it can be made with current manufacturing equipment. If the flexible substrate is formed as a film, it can be made by roll-to-roll manufacturing equipment. The substrate 30 has a color filter layer formed thereon (not shown). Forming this color filter layer is not essential in the manufacturing process. Subsequently, an electrode layer 32 is formed on the substrate 30. The electrode layer 32 is designed to be a driving electrode for a passive matrix or a segment driving display device, or to be a common electrode layer.

Figure 3:
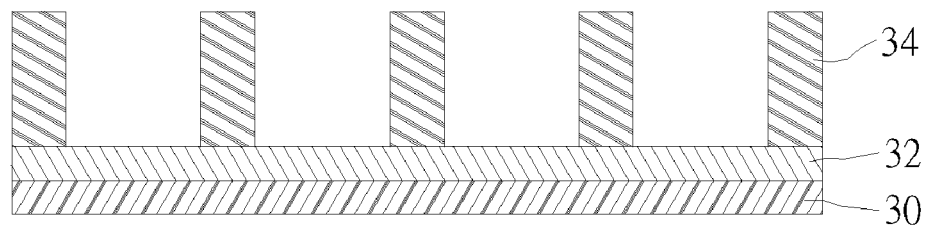
FIG. 3 shows wall structures of the modularized display component made in accordance with the manufacturing procedure of the present invention.

Reference is made to FIG. 3, which shows wall structures of the modularized display component made in accordance with the manufacturing procedure of the present invention. Multiple wall structures 34 are formed on the electrode layer 32. These wall structures 34 are made by screen printing, molding, or photolithography processes. The wall structures 34 can be open shape structures or closed shape structures. If the wall structures 34 are open shape structures, they can be formed with a straight-line shape, a cross shape, or a trident shape. If the wall structures 34 are closed shape structures, they can be formed with a rectangular shape, a circular shape, or a cellular shape.

Figure 4:
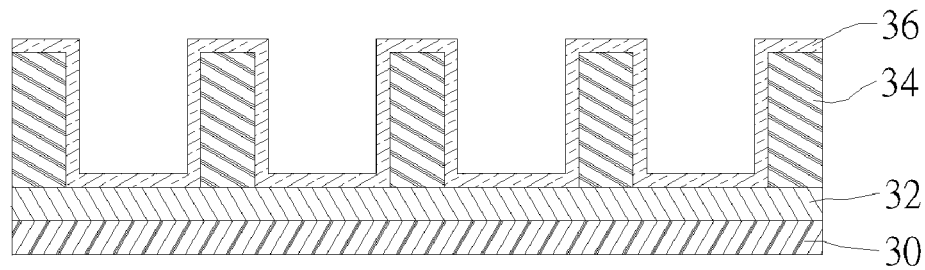
FIG. 4 shows an alignment layer of the modularized display component made in accordance with the manufacturing procedure of the present invention.

Reference is made to FIG. 4, which shows an alignment layer of the modularized display component made in accordance with the manufacturing procedure of the present invention. An alignment layer 36 is formed to cover the wall structures 34. The alignment layer 36 is formed via a printing process. The printing process can be a letterpress printing process, an ink-jet printing process, or the like. If the ink-jet printing process is used to form the alignment layer 36, different alignment materials can be used to form a trans-reflective, reflective or transmissive displaying component. During the process of forming the alignment layer 36, a contact alignment process or a non-contact alignment process should be used. The contact alignment process can be performed via a rubbing alignment action using a flannelette cloth while the non-contact alignment process can be performed via a photo-alignment action.

Figure 5:
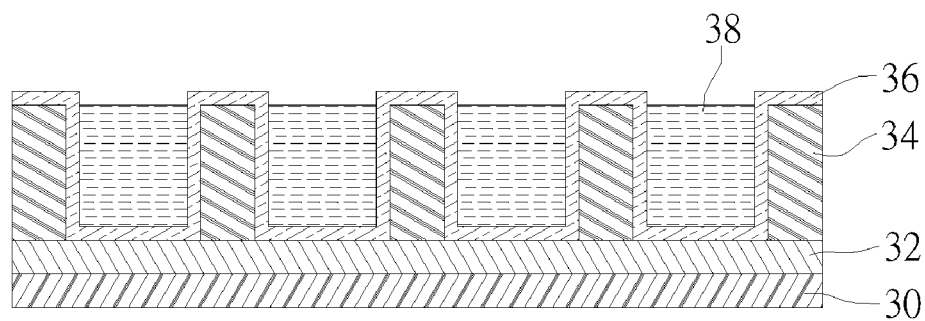
FIG. 5 shows the filling action of display medium of the modularized display component in accordance with the manufacturing procedure of the present invention.

Reference is made to FIG. 5, which shows the filling action of display medium of the modularized display component in accordance with the manufacturing procedure of the present invention. After the alignment layer is formed, the display medium 38 then fills the spaces formed between the wall structures 34 above the alignment layer 36. The display medium 38 consists of liquid crystals or a mixture of liquid crystals and prepolymers. In addition, the display medium 38 can be filled in the spaces via a slit coating process, a blade coating process, a one-drop-fill (ODF) process, or an ink-jet printing process. When the ink-jet printing process is used, different liquid crystal materials can be used to fill the spaces formed between the wall structures 34 above the alignment layer 36. For example, liquid crystal materials with different colors can be used to form a color display component.

Figure 6:
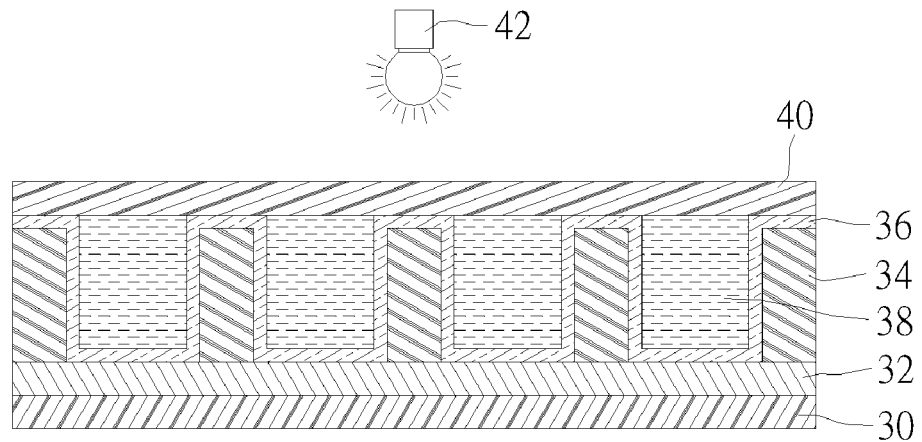
FIG. 6 shows the first embodiment for forming a protective layer of the modularized display component in accordance with of the present invention.

Reference is made to FIG. 6, which shows the first embodiment for forming a protective layer of the modularized display component in accordance with of the present invention. A protective layer 40 is formed above the alignment layer 36 and the display medium 38. The protective layer 40 is an air-tight layer and formed via a coating process. The protective layer 40 of this embodiment does not have the alignment feature. If the protective layer 40 needs to have the alignment feature, an ultraviolet light source 42 can be used to initiate a photo polymerization induced phase separation process and form a polymer network structure in the display medium 38. The display medium 38 is a mixture of liquid crystals and prepolymers.

Figure 7:
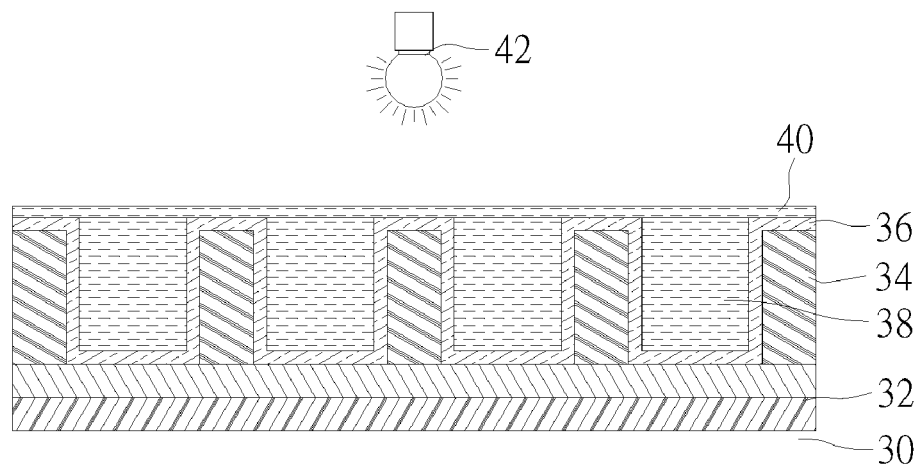
FIG. 7 shows the second embodiment for forming a protective layer of the modularized display component in accordance with of the present invention.

Reference is made to FIG. 7, which shows the second embodiment for forming a protective layer of the modularized display component in accordance with the present invention. In this embodiment, a polymerization induced phase separation process is used to induce the phase separation reaction of the display medium 38 to form the protective layer 40 having the alignment feature on the display medium 38. The polymerization induced phase separation process is performed via an ultraviolet light source 42. The display medium 38 is a mixture of liquid crystals and prepolymers.

Figure 8:
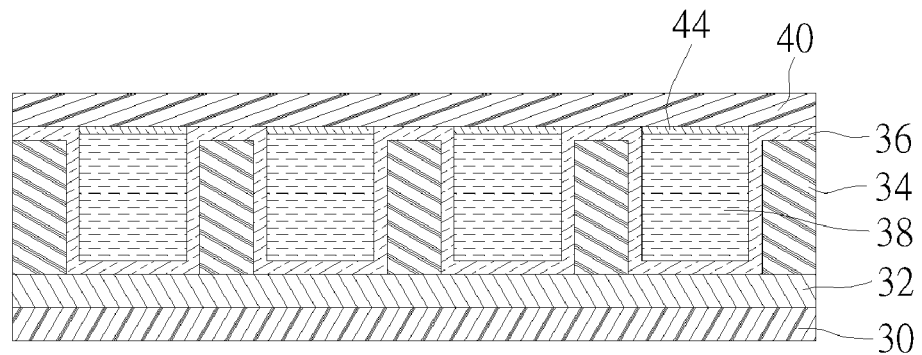
FIG. 8 shows the third embodiment for forming a protective layer of the modularized display component in accordance with of the present invention.

Reference is made to FIG. 8, which shows the third embodiment for forming a protective layer of the modularized display component in accordance with of the present invention. In this embodiment, the protective layer 40 is provided by attachment with an adhesive material. The protective layer 40 itself does not have the alignment feature. Hence, before forming the protective layer 40, alignment layers 44 are provided on the display medium 38. The alignment layers 44 can be provided on the display medium 38 via a coating process, or an ink-jet printing process. If the ink-jet printing process is used to form the alignment layers 44, different alignment materials can be used to form a trans-reflective, reflective or transmissive displaying component. Lastly, the protective layer 40 is formed thereon. The display medium 38 consists of pure liquid crystals.

Figure 9:
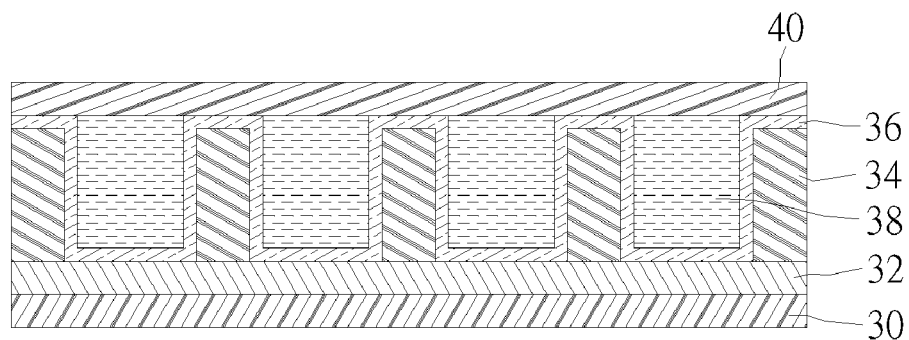
FIG. 9 is a schematic diagram of the modularized display component in accordance with the present invention.

Reference is made to FIG. 9, which is a schematic diagram of the modularized display component in accordance with the present invention. The modularized display component includes an electrode layer 32 formed on the substrate 30. The substrate 30 is flexible and the appearance of the substrate 30 is a sheet or a film. The electrode layer 32 is designed to be a driving electrode for a passive matrix or a segment driving display device, or to be a common electrode layer. A color filter layer is formed on the substrate 30 (not shown). Forming this color filter layer is not essential in the manufacturing process. Multiple wall structures 34 are formed on the electrode layer 32. An alignment layer 36 covers the wall structures 34. Display medium 38 fills the spaces formed between the wall structures 34 above the alignment layer 36. The alignment layer 36 itself can be formed with or without the alignment feature. If the alignment layer 36 has the alignment feature, it can be made according to the manufacturing process mentioned in FIG. 7. If the alignment layer 36 does not have the alignment feature, it can be made according to the manufacturing process described in accord with FIG. 6 or 8.

Figure 10:
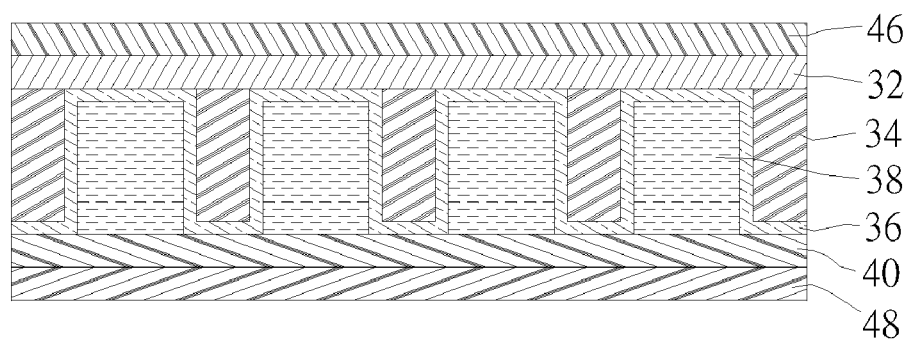
FIG. 10 shows an adhesive layer of the display device having the modularized display component provided in accordance with the present invention.
Figure 11:
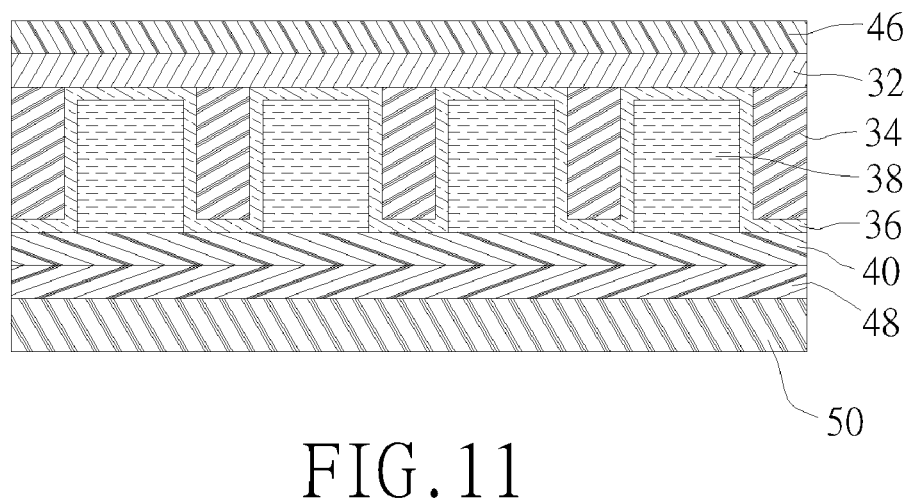
FIG. 11 shows a substrate of the display device having the modularized display component provided in accordance with the present invention.
Figure 12:
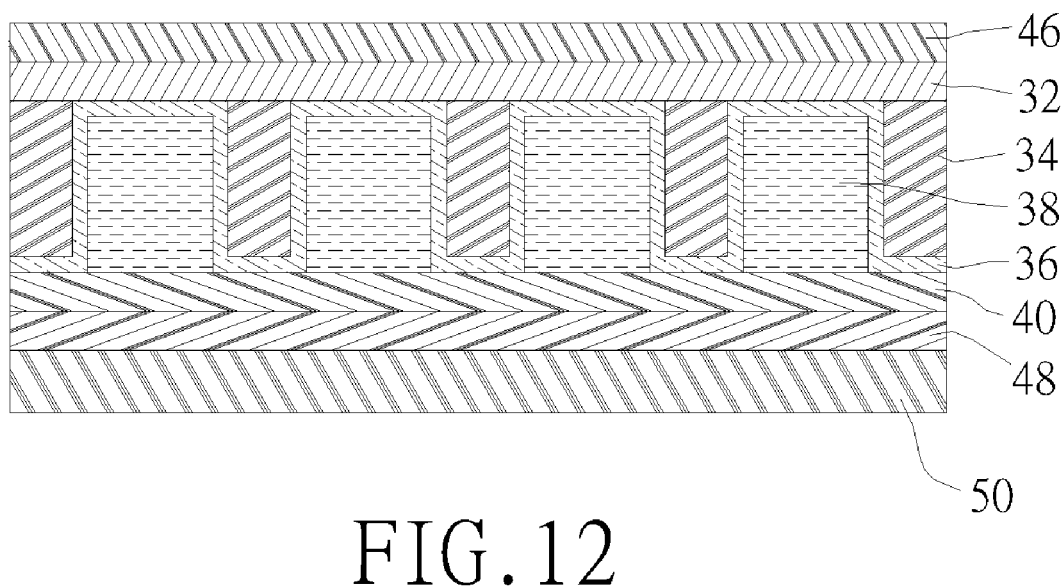
FIG. 12 is a schematic diagram of the display device having the modularized display component in accordance with the present invention.

FIGS. 10-12 are used to show the manufacturing process of attaching the modularized display component of the present invention to a driving component to form a display device.

Reference is made to FIG. 10, which shows an adhesive layer of the display device having the modularized display component provided in accordance with the present invention. The modularized display component includes an electrode layer 32 formed on a first substrate 46. The first substrate 46 is flexible and the appearance of the substrate 46 is a sheet or a film. The electrode layer 32 is designed to be a driving electrode for a passive matrix or a segment driving display device, or to be a common electrode layer. A color filter layer is formed on the first substrate 46 (not shown). Forming this color filter layer is not essential in the manufacturing process. Multiple wall structures 34 are formed on the electrode layer 32. An alignment layer 36 covers the wall structures 34. Display medium 38 fills the spaces formed between the wall structures 34 above the alignment layer 36. A protective layer 40 is formed on the alignment layer 36 and the display medium 38. An air-tight adhesive layer 48 is provided on the protective layer 40 and made of an adhesive material.

Reference is made to FIG. 11, which shows a substrate of the display device having the modularized display component provided in accordance with the present invention. In FIG. 11, a second substrate 50 is provided on the air-tight adhesive layer 48 shown in FIG. 10. The second substrate 50 can be a glass substrate or a flexible substrate.

Reference is made to FIG. 12, which is a schematic diagram of the display device having the modularized display component in accordance with the present invention. The display device includes an electrode layer 32 formed on a first substrate 46. The first substrate 46 is flexible and the appearance of the first substrate 46 is a sheet or a film. The electrode layer 32 is designed to be a driving electrode for a passive matrix or a segment driving display device, or to be a common electrode layer. A color filter layer is formed on the first substrate 46 (not shown). Forming this color filter layer is not essential in the manufacturing process. Multiple wall structures 34 are formed on the electrode layer 32. An alignment layer 36 covers the wall structures 34.

Display medium 38 fills the spaces formed between the wall structures 34 above the alignment layer 36. A protective layer 40 is formed on the alignment layer 36 and the display medium 38. An air-tight adhesive layer 48 is provided on the protective layer 40. A second substrate 50 is provided on the air-tight adhesive layer 48. The second substrate 50 can be a glass substrate or a flexible substrate. The second substrate 50 includes a layer deployed with driving components, called a driving circuit layer. The driving circuit layer can be a thin-film-transistor (TFT) layer, a passive matrix layer, or a segment driving circuit layer.

In the present invention, only one side of the modularized display component has an electrode layer for attachment to a driving circuit layer. The electrode layer of the modularized display component is a common conductive layer and the driving voltage can be adjusted via the driving circuit layer.

The modularized display component of the present invention has advantages as follows:

1. Due to the modulization design, the modularized display component can be attached to any driving circuit layer to form a complete display device;

2. Various manufacturing processes can be used to make the alignment layer of the modularized display component have the alignment feature;

3. Various manufacturing processes can be used to make the protective layer of the modularized display component formed with or without the alignment feature; and 4. The modularized display component of the present invention can be manufactured on a large scale.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are embraced within the scope of the invention as defined in the appended claims.

What is claimed is:

1. A method for manufacturing a modularized display component, comprising steps of:
   providing a substrate;
   forming an electrode layer on the substrate;
   providing a plurality of wall structures on the electrode layer;
   forming an alignment layer covering the wall structures;
   filling display medium into spaces enclosed with the wall structures above the alignment layer; and
   forming a protective layer on top of the filled wall structures, wherein the protective layer having an alignment feature is formed by the polymerization induced phase separation process.

2. The method according to claim 1, wherein the substrate is a flexible substrate.

3. The method according to claim 2, wherein an appearance of the flexible substrate is a sheet or a film.

4. The method according to claim 1, further comprising a color filter layer formed on the surface of the substrate.

5. The method according to claim 1, wherein the electrode layer is designed to be a driving electrode for a passive matrix or a segment driving display device, or to be a segment driving common electrode layer.

6. The method according to claim 1, wherein the wall structures are made by screen printing, molding, or photolithography processes.

7. The method according to claim 1, wherein a pattern of the wall structures is designed as an open shape structure or closed shape structure.

8. The method according to claim 7, wherein the open shape structures are formed with a straight-line shape, a cross shape or a trident shape.

9. The method according to claim 7, wherein the closed shape structures are formed with a rectangular shape, a circular shape, or a cellular shape.

10. The method according to claim 1, wherein the alignment layer is made by a printing process.

11. The method according to claim 1, wherein an alignment direction of the alignment layer is produced by a contact alignment process or a non-contact alignment process.

12. The method according to claim 11, wherein the contact alignment process is a rubbing alignment action using a flannelette cloth.

13. The method according to claim 11, wherein the non-contact alignment process is a photo-alignment action.

14. The method according to claim 1, wherein the display medium is filled in the spaces by slit coating, blade coating, ink-jet printing, or one-drop-fill (ODF) process.

15. The method according to claim 1, wherein the display medium consists of liquid crystals or a mixture of liquid crystals and prepolymers.

16. The method according to claim 1, wherein the display medium is a mixture consisting essentially of liquid crystals and prepolymers.

17. A method for manufacturing a modularized display component, comprising steps of:
   providing a substrate;
   forming an electrode layer on the substrate;
   providing a plurality of wall structures on the electrode layer;
   forming an alignment layer covering the wall structures;
   filling display medium into spaces enclosed with the wall structures above the alignment layer;
   forming a protective layer on top of the filled wall structures, wherein the protective layer is provided by a coating process or by attachment of an adhesive material;

using an ultraviolet light source to initiate a photo polymerization induced phase separation process, and form a polymer network structure having alignment feature in the display medium.

18. The method according to claim 17, wherein the protective layer is formed without the alignment function.

19. The method according to claim 17, wherein the display medium is a mixture consisting essentially of liquid crystals and prepolymers.

20. A method for manufacturing a display device having a modularized display component, comprising steps of:
providing a first substrate;
forming an electrode layer on the first substrate;
providing a plurality of wall structures on the electrode layer;
forming an alignment layer covering the wall structures;
filling display medium into spaces enclosed with the wall structures above the alignment layer, wherein the display medium has a plurality of liquid crystals and dispersed polymers;
forming a protective layer on top of the filled wall structures, wherein the protective layer having an alignment feature is formed by a polymerization induced phase separation process between the liquid crystals and the dispersed polymers;
providing an air-tight adhesive layer on the protective layer; and
providing a second substrate on the air-tight adhesive layer.

21. The method according to claim 20, wherein the first substrate is a flexible substrate.

22. The method according to claim 21, wherein the appearance of the flexible substrate is a sheet or a film.

23. The method according to claim 20, further comprising a color filter layer formed on the surface of the substrate.

24. The method according to claim 20, wherein the electrode layer is designed to be a driving electrode for a passive matrix or a segment driving display device, or to be a common electrode layer.

25. The method according to claim 20, wherein the wall structures are made by screen printing, molding, or photolithography processes.

26. The method according to claim 20, wherein the patterns of the wall structures can be designed as an open shape structure or closed shape structure.

27. The method according to claim 26, wherein the open shape structures are formed with a straight-line shape, a cross shape or a trident shape.

28. The method according to claim 26, wherein the closed shape structures are formed with a rectangular shape, a circular shape, or a cellular shape.

29. The method according to claim 20, wherein the alignment layer is made by a printing process.

30. The method according to claim 20, wherein the alignment direction of the alignment layer is produced by a contact alignment process or a non-contact alignment process.

31. The method according to claim 30, wherein the contact alignment process is a rubbing alignment action using a flannelette cloth.

32. The method according to claim 30, wherein the non-contact alignment process is a photo-alignment action.

33. The method according to claim 20, wherein the display medium is filled in the spaces by slit coating, blade coating, ink-jet printing, or an one-drop-fill (ODF) process.

34. The method according to claim 22, wherein the display medium consists of liquid crystals or a mixture of liquid crystals and prepolymers.

35. The method according to claim 20, wherein the display medium is a mixture consisting essentially of liquid crystals and prepolymers.

36. The method according to claim 20, wherein the second substrate is a glass substrate or a flexible substrate.

37. A method for manufacturing a display device having a modularized display component, comprising steps of:
providing a first substrate;
forming an electrode layer on the first substrate;
providing a plurality of wall structures on the electrode layer;
forming an alignment layer covering the wall structures;
filling display medium into spaces enclosed with the wall structures above the alignment layer;
forming a protective layer on top of the filled wall structures, wherein the protective layer is provided by a coating process or by attachment of an adhesive material;
providing an air-tight adhesive layer on the protective layer;
providing a second substrate on the air-tight adhesive layer; and
using an ultraviolet light source to initiate a photo polymerization induced phase separation process, and form a polymer network structure having alignment feature in the display medium.

38. The method according to claim 37, wherein the display medium is a mixture consisting essentially of liquid crystals and prepolymers.

* * * * *